US011978994B2

(12) United States Patent
Janzen

(10) Patent No.: US 11,978,994 B2
(45) Date of Patent: May 7, 2024

(54) ELECTRICAL TERMINAL BLOCK

(71) Applicant: Phoenix Contact GmbH & Co. KG, Blomberg (DE)

(72) Inventor: Wjatscheslaw Janzen, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 447 days.

(21) Appl. No.: 17/290,287

(22) PCT Filed: Oct. 30, 2019

(86) PCT No.: PCT/EP2019/079576
§ 371 (c)(1),
(2) Date: Apr. 30, 2021

(87) PCT Pub. No.: WO2020/089257
PCT Pub. Date: May 7, 2020

(65) Prior Publication Data

US 2021/0376502 A1 Dec. 2, 2021

(30) Foreign Application Priority Data

Oct. 30, 2018 (BE) .................................. 2018/5755

(51) Int. Cl.
*H01R 9/26* (2006.01)
*H01R 9/24* (2006.01)
*H01R 13/24* (2006.01)

(52) U.S. Cl.
CPC ......... *H01R 9/2616* (2013.01); *H01R 9/2491* (2013.01); *H01R 9/2666* (2013.01); *H01R 13/2428* (2013.01)

(58) Field of Classification Search
CPC ...... H01R 9/2616; H01R 9/2608; H01R 9/26; H01R 9/2666; H01R 9/24; H01R 9/2491; H01R 9/2428
USPC .......................................................... 439/716
See application file for complete search history.

(56) References Cited

U.S. PATENT DOCUMENTS

| | | | | | |
|---|---|---|---|---|---|
| 3,289,146 | A * | 11/1966 | Tuchel | H01R 12/721 439/743 |
| 5,658,172 | A * | 8/1997 | Schmidt | H01R 9/26 439/716 |
| 7,666,037 | B2 * | 2/2010 | Diessel | H01R 13/7034 439/94 |
| 8,961,208 | B2 | 2/2015 | Bentler et al. | |
| 9,081,033 | B2 * | 7/2015 | Hackemack | H01R 9/2666 |
| 9,153,916 | B2 * | 10/2015 | Schloo | H01R 13/703 |
| 9,476,909 | B2 | 10/2016 | Kloppenburg | |
| 10,361,497 | B2 * | 7/2019 | Kloppenburg | H01R 9/2491 |
| 10,594,059 | B1 * | 3/2020 | Bieda | H01R 9/2408 |
| 2014/0148035 | A1 * | 5/2014 | Hackemack | H01R 9/16 439/345 |
| 2018/0269636 | A1 * | 9/2018 | Schyrocki | H01R 9/2491 |

* cited by examiner

*Primary Examiner* — Harshad C Patel
(74) *Attorney, Agent, or Firm* — David S. Safran; Calderon Safran & Cole, P.C.

(57) ABSTRACT

An electrical terminal block with simplified switching operations, which can be produced in a cost-effective and time-saving manner.

11 Claims, 8 Drawing Sheets

ELECTRICAL TERMINAL BLOCK

BACKGROUND OF THE INVENTION

Field of the Invention

The invention relates to an electrical series terminal, with a clamp housing, with at least two line terminal elements that are arranged therein, and with two current bars. The current bars in each case have a connecting section, a first sprung contact section, and a second sprung contact section. The connecting sections are in each case assigned to a line terminal element, wherein the first contact sections together form a first contact area and the second contact sections together form a second contact area for accommodating and contacting the plug of a test plug or an isolating plug. The first contact sections make contact when no plug is inserted, so that the two line terminal elements are connected to one another electrically via the two current bars, and the second contact sections are separated from one another when no plug is inserted. The second contact area of the current bars is arranged in the insertion direction of the plug before the first contact area of the current bars. The two current bars in each case consist of two individual metal strips, which are connected to one another in an electrically-conductive manner. The two connecting sections are in each case made on a first metal strip, and the contact sections are formed together in each case by a second metal strip. In addition, the invention also relates to a series terminal block that comprises at least two series terminals that are arranged one next to the other.

DESCRIPTION OF THE RELATED ART

Electrical series terminals have been known for decades and have been used in the millions in the wiring of electrical units and devices. In most cases, the clamps are snapped onto support rails, a number of which in turn are frequently arranged in a switch cabinet. In the switching, cutting, and regulating fields, disconnect-option through clamps are the standard. The disconnect option provided in the case of such through clamps by the formation of a cut point in the current bar makes it possible in this case to insert various plugs with various functions into the clamp housing of the series terminals, which then make contact with the current bar at the cut point. As plugs, in this case in addition to simple isolating plugs or through connectors, in particular, it is also possible to use test plugs, which can have special components and make it possible to check the proper function of the circuit that is connected to the series terminal.

Series terminals with cut points are used in particular for connecting current transformers. An important functional characteristic in this case consists in that a connected current transformer is short-circuited when the secondary circuit is separated from the load.

Electrical series terminals, which are in general designed in the shape of a disk, are frequently plugged together with multiple other electrical series terminals to form a series terminal block and are snapped onto a support rail or mounted in a wall section, for example, a switch cabinet. Accordingly, the individual test plugs, which in their width generally correspond to the width of the series terminals, are also connected to a test plug block and together are mounted on a corresponding series terminal block. In this case, the requirement exists that the number of series terminals that are connected to one another, as well as the number of test plugs that are combined with one another to form a test plug block, is freely selectable. At the same time, however, the test plugs that are combined to form a test plug block are to be actuated together as simply as possible, i.e., they can be plugged onto the series terminal block together.

Frequently, in the case of a test process in certain series terminals in a series terminal block, the electrically-conductive connections are initially to be interrupted before the connection of the remaining series terminals is separated. It is known from the state of the art that the switching operations of the time-offset separation of the electrical connection are carried out by various plugs.

German Patent Application DE 10 2012 017 429 A1 and corresponding U.S. Pat. No. 9,476,909 B2 show, for example, a test plug block, in which the individual test plugs of the test plug block have contact plugs of different lengths. When the test plug block is plugged onto a series terminal block, the longer contact plugs of individual test plugs are then first inserted into the corresponding openings in the clamp housing of the series terminals and there make contact with the first contact area of the two current bars, which leads in the plug-in direction of the test plug. If the test plug block is then plugged onto the series terminal block, the longer contact plugs are inserted into the second contact area, by which this contact area is opened, so that the electrically-conductive connection between the two current bars—and thus also between the two line terminal elements that are connected to the current bars—is interrupted. If the test plug block is then plugged onto the series terminal block, the shorter contact plugs next make contact initially corresponding to the leading contact area in the series terminals, before the shorter contact plugs also open the second contact area, and thus also the current of these series terminals is interrupted and optionally is diverted over the test plugs.

In the case of the test plug blocks or series terminal blocks that are known from the state of the art, it is disadvantageous that plugs of different lengths have to be used for various switching operations. This makes it more difficult to design a test plug block that is suitable for the desired purpose, since it has to provide innumerable options for arranging the individual plugs.

SUMMARY OF THE INVENTION

It is therefore the object of this invention to indicate a series terminal as well as a series terminal block, in which the switching operations can be carried out in a simplified manner and which can be produced in a way that saves time and cost.

This object is achieved with the electrical series terminal as described herein in that the first metal strips have a stepped area with at least two steps on their end that faces away from the connecting section and in that the second two metal strips are fastened to two steps, opposite one another, of the stepped area of the first metal strips. The clamp housing is preferably configured so that the second metal strips can be fastened to any step of the stepped area. The clamp housing offers enough space that the second metal strips do not project beyond the clamp housing. Depending on to which step the second metal strips are fastened, the current bars overall are shorter or longer. The opposite contact sections are fastened in each case to the same steps, so that the contact sections overall are arranged to be mirror images of one another.

The forming of the second contact area on the current bars ensures that an inserted plug of a test or isolating plug first contacts the second contact sections before the electrical contact of the two current bars in the first contact area is separated by the insertion of the plug.

To ensure easier assembly and optimum operability, it is provided in the case of an advantageous configuration of the electrical series terminal that the second metal strips are designed as C-shaped contact springs, which are fastened with their C-crests to a step of the stepped area of the first metal strips. The two contact sections that face one another of the two contact springs are used in this case as a type of feed hopper for the plug of the test or isolating plug that is to be inserted, so that the risk of tilting is minimized and the plug is guided simultaneously into the contact area. Because of the configuration and bending of the second metal strips to form contact springs with two legs, contact force that acts from the contact springs on an inserted plug can be accordingly simply adapted to the respective requirements.

In the case of an advantageous configuration of the invention, at least one first step and one second step are provided on the stepped area, and the first step is arranged in the insertion direction of the plug behind the second step. The stepped area consequently extends in the direction of the insertion direction of the plug. The contact sections are located, depending on the step, either deeper in the housing or closer to the housing wall or closer to the insertion point of the plug. When the second metal strips with the contact sections are arranged on the first step, the first metal strips and the second metal strips overlap. Depending on how many steps are provided, the first metal strips and the second metal strips overlap in the full length of the C-crest of the second metal strips or the first metal strips even project over the second metal strips. When the second metal strips are fastened to the last step, the maximum length of the current bars is reached. The minimum length of the current bars is reached when the second metal strips are arranged on the first step of the stepped area of the first metal strips.

For a simplified production of the series terminal according to the invention, it is provided in the case of another configuration that the stepped areas of the first two metal strips are configured to be mirror images of one another and to be congruent to the other part of the first metal strips. Due to the mirror-image arrangement of the stepped areas, the latter are arranged approximately V-shaped with respect to one another. The distance between the opposite steps of the two connecting sections is greater with an increasing number of steps. The distance between the first steps is smaller than the distance between the second steps with respect to one another, since the steps are also oriented outward because of the step projections. Due to the step projections, in each case a defined area is preset for the contact sections, to which defined area the contact sections can be fastened.

In an advantageous configuration of the invention, the first metal strips are slightly angled at the transition to the stepped area, so that the opposite steps of the stepped areas are all approximately the same distance apart.

Overall, in this configuration, only two different current bars are necessary to make possible a host of configurations of the series terminal. In this way, the production expense is considerably reduced in comparison to the state of the art.

In an advantageous configuration of the invention, it is provided that two spring elements are arranged in the clamp housing, which in each case have a sprung contact section, that the contact sections of the two spring elements together form another contact area for the plug, which is arranged in the insertion direction of the plug before the second contact area of the current bars, and that at least one of the spring elements has a receptacle for a leg of a jumper, wherein in each case, a spring element is connected in an electrically-conductive manner to a current bar via the plug, when the plug of a test plug or an isolating plug is inserted into the series terminal.

Consequently, in the case of the electrical series terminal, two leading spring elements are arranged in the clamp housing, so that when the plug of a test or isolating plug is inserted, the latter is first contacted by the contact sections of the spring elements before the plug strikes the contact sections of the current bars and also contacts the latter. Before the plug of a test or isolating plug thus separates the contact between the contact sections of the two current bars, an electrical contact is produced between the plug and the additional spring elements. An electrically conductive connection is then made between respectively one spring element and the assigned current bar via the plug of a test or isolating plug that is inserted into the series terminal.

For a connection of multiple series terminals to one another, in the case of the inserted plug, it is provided in another configuration of the invention that in at least one of the spring elements, a recess is designed as a receptacle for inserting a leg of a jumper.

In this case, the spring elements can be designed overall approximately S-shaped, wherein the connecting sections are also used for secure attaching and holding of the spring elements in the clamp housing. The production of the spring elements can thus be further simplified when a recess is punched out from the corresponding spring element, in particular its connecting section, as a receptacle for inserting a leg of a jumper. The spring elements can then be manufactured especially simply as punch-bent parts.

For easier operation, in a configuration of this invention, it is provided that at least one plug opening for inserting the leg of a jumper into the receptacle of a spring element is designed in the clamp housing, wherein the plug opening is accessible from a first side, the operator side. As was explained in the beginning, series terminals or a series terminal block that consists of multiple series terminals that are arranged one next to the other in general snap onto a support rail, which is fastened in a switch cabinet. As an alternative, such a series terminal block can also be inserted directly into a corresponding opening in a cabinet wall. The orientation of the series terminals is in this case always the same, so that the series terminals are arranged with their operator side facing toward the cabinet opening or with the operator side projecting from the opening in a cabinet wall. The plug opening is consequently accessible from the operator side to allow easier operation.

Accordingly, in the case of another configuration of the invention, it is provided that an opening for inserting the plug of a test plug or an isolating plug in the contact areas is made in the clamp housing, wherein the opening is accessible from a first side, the operator side.

For a direct connection of two series terminals, it is provided in the case of another configuration of the invention that in at least one of the first metal strips, a bridge recess and at least one corresponding bridge shaft that is made in the clamp housing are designed for accommodating a leg of a jumper. The additional bridge shaft for accommodating the leg of a jumper can be arranged laterally on the housing. If the bridge recesses are provided on both first metal strips, the latter can be configured offset to one another. Accordingly, the bridge shafts can also be made offset to one another in the clamp housing, so that in the case of two inserted jumpers, no obstructions occur. The jumpers can be inserted easily into the offset arrangement even up to the center of the clamp housing.

According to a second teaching, the invention relates to a series terminal block with at least two series terminals that are arranged one next to the other, according to claim 10. The series terminal block according to the invention is characterized in that the series terminals are configured according to the invention.

The embodiments relative to the series terminal according to the invention accordingly also apply to the series terminal block, according to the invention, with multiple series terminals.

In one configuration of the series terminal block, it is provided that the second metal strips of at least one series terminal are fastened to another step of the stepped area of the first metal strips as the second metal strips of the other series terminal. As already described at the beginning, it is common in the state of the art that in the case of series terminal blocks, various test plugs with various lengths are used, so that when the test plug block is plugged onto a series terminal block, first the longer contact plugs insert individual test plugs into the corresponding openings in the clamp housing of the series terminals. In this way, various series terminals can first make contact or the connections can first be separated, whereas the electrically-conductive connection is or has to be separated possibly only later from other series terminals.

With this invention, it is no longer necessary that plugs of various lengths be used. From the outset, the series terminal can be adapted to the desired purpose, and the contact sections can be fastened in a certain position in the housing to the first metal strips. Thus, contacts that are arranged on the last step of the stepped area first make contact when a test plug is inserted, since the contacts are arranged closer to the insertion opening of the plug in the clamp housing. Accordingly, contacts of the contact sections are only later contacted, when they are arranged on one of the first steps. The individual switching operations are consequently no longer achieved by different plugs, but rather by the different arrangement of the contact sections inside the clamp housing. The risk of a false contact, because of a mis-selected test plug, is consequently avoided, since for each series terminal of the same test plug or for each series terminal block, a test plug block with the same test plugs can be used.

Should it not be necessary to make a distinction between the switching operations, it is provided in the case of an alternative configuration of the series terminal block that second metal strips of the series terminals are fastened in each case to the same step of the stepped area of the first metal strips. Thus, identical series terminals are arranged in the series terminal block. The contact sections are all arranged on the same plane, so that on the one side, a test plug block or various test plugs can still be used, when this corresponds to the user's desire. On the other side, in the case of identical test plugs, identical switching operations are also possible, since the test plugs contact the contact sections at the same time during insertion.

In particular, there are now a number of options for configuring and further developing the series terminal according to the invention as well as the series terminal block according to the invention. To this end, reference is made to the following detailed description of preferred embodiments with reference to the accompanying drawings.

DETAILED DESCRIPTION OF THE INVENTION

Figure 1A:
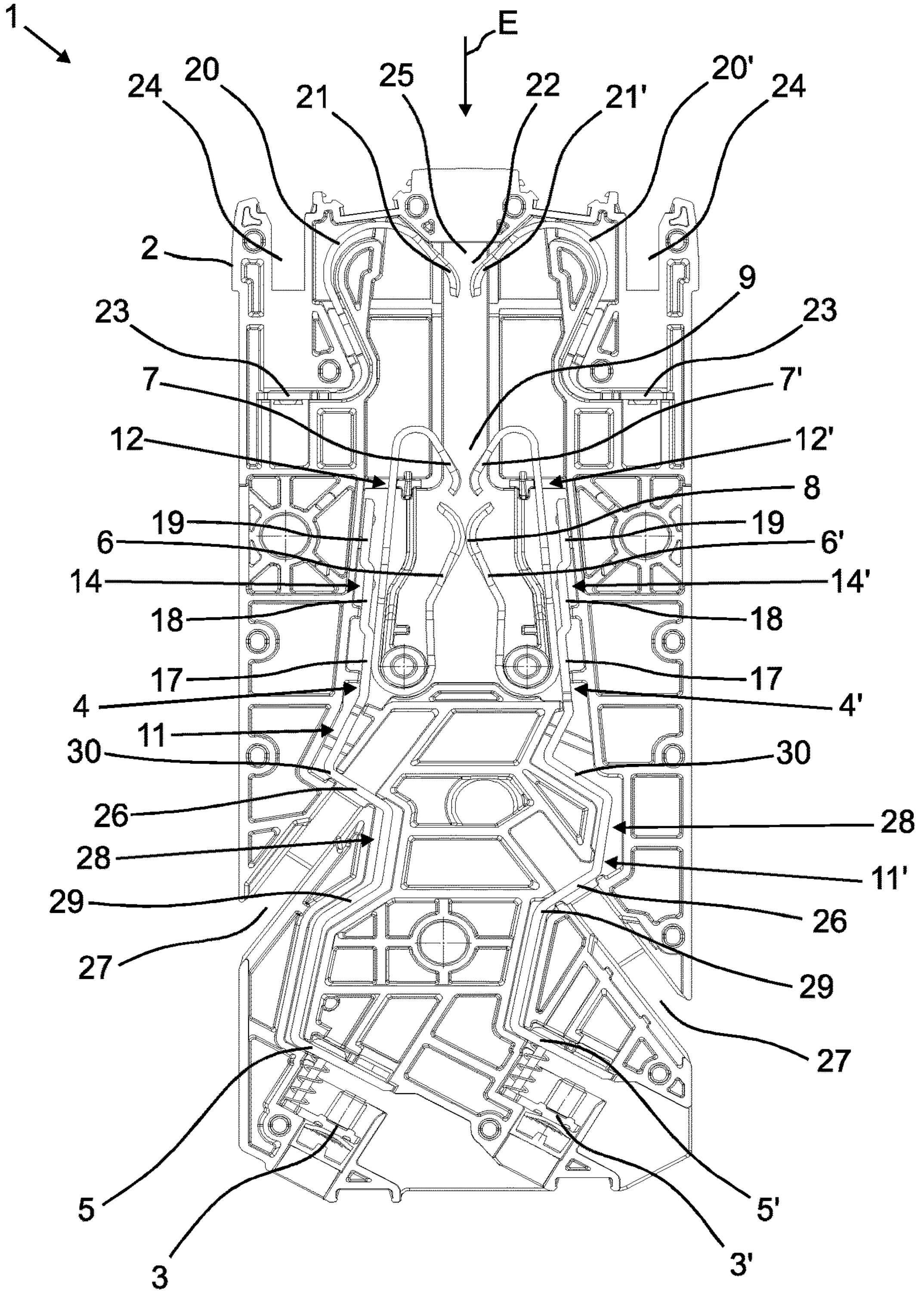
FIG. 1*a* shows a diagrammatic depiction of a series terminal, in a longitudinal section.

FIG. 1*a* shows an electrical series terminal 1 according to the invention. The series terminal 1 has a clamp housing 2 that is made of plastic. In the interior of the clamp housing 2, two line terminal elements 3, 3' are arranged, which in this case are screw clamps. As an alternative, however, other types of terminal elements, for example, tension spring clamps, leg spring clamps, or cutting terminals, can also be used as line terminal elements 3, 3'.

Moreover, two current bars 4, 4' are also arranged in the clamp housing 2. The current bars 4, 4' are in each case configured in two parts, wherein a screw clamp has a connecting section 5, 5' for connecting the current bars 4, 4' to the line terminal elements 3, 3'. In each case, a first contact section 6, 6' and a second contact section 7, 7' are made on the current bars. The first contact section has a first contact area 8, and the second contact section 7, 7' has a second contact area 9, which can be contacted by a plug 10, not depicted here.

The connecting sections are made on a first metal strip 11, 11', and the contact sections 6, 6', 7, 7' are made on a second metal strip 12, 12'. The first contact sections 6, 6' of the two current bars 4, 4' are designed and arranged opposite the second metal strips 12, 12' in such a way that together they form the first contact area 8 for the plug 10 of a test or isolating plug, not depicted here. The first contact sections 6, 6' make contact, so that they are connected to one another in an electrically conductive manner when no plugs 10 are inserted into the series terminal 1. The second contact sections 7, 7' are also oriented opposite to one another and together form the second contact area 9. The second contact sections 7, 7' do not make contact. When a plug 10, not depicted here, is inserted, the second contact area 9, which leads in the insertion direction E, consequently first makes contact before the electrically-conductive connection of the first contact area 8 is separated.

The first metal strips are connected at their ends 13 that face away from the contact sections 6, 6', 7, 7' to the connecting section 5, 5' with the screw clamps. At the other end, the first metal strips 11, 11' have a stepped area 14, 14'. In this embodiment, three steps 17, 18 and 19 are provided. It can be seen from FIGS. 1*a*, 1*b*, and 1*c* that the second metal strips 12, 12', which are configured in the form of a contact spring 16, can be arranged at various steps 14 and can thus be located at various positions in the clamp housing 2. The contact sections 6, 6', 7, 7' that are made on the second metal strips 12, 12' can thus be moved in particular in the insertion direction E of a plug 10, not depicted here, deeper into the clamp housing 2 or closer in the direction of the front side of the clamp housing 2. In the insertion direction E, the steps 17, 18 and 19 are arranged behind one another, wherein a first step 17 is arranged behind a second step 18, and the second step 18 is arranged behind a third step 19.

In addition, spring elements 20, 20' are arranged in the clamp housing 2. The spring elements 20, 20' are not electrically conductively connected to the current bars 4, 4' in the initial state of the series terminal 1 according to FIG. 1, i.e., in the case where the plug 10 is not inserted. The two spring elements 20, 20' in each case have a sprung contact section 21, 21', wherein the spring elements 20, 20' are arranged to be mirror images of one another in such a way that the contact sections 21, 21' form another contact area 22 for a plug 10 of a test plug or an isolating plug. In this case, as depicted in the figures, the contact sections 21, 21' can be some distance apart, so that they do not make contact. In principle, the contact sections 21, 21' can also be designed and arranged in such a way, however, that the contact sections 21, 21' make contact when no plug 10 is inserted.

The spring elements 20, 20' are used so as to create in a simple way a cross-bridging between two series terminals 1. For this purpose, a recess is designed as a receptacle 23 for a leg of a jumper in at least one of the two spring elements 20, 20'. In the case of two adjacent series terminals 1, two spring elements 20 or 20' are then connected onto one another electrically via the two legs of a jumper.

When the plug 10 of a test plug is inserted into a series terminal 1, this means that, in each case, a spring element 20, 20' is electrically conductively connected to the assigned current bar 4, 4'. In the completely inserted state of the plug 10, moreover, the two current bars 4, 4' in the first contact area 8 are separated from one another by the plug 10, so that then the two line terminal elements 3, 3' also are no longer electrically connected to one another via the current bars 4, 4'.

The spring elements 20, 20', which can be produced easily from a metal strip by punching-out and subsequent bending, have—in addition to the approximately C-shaped contact sections 21, 21'—in each case additionally an essentially straight connecting section, in which the receptacle 23 for inserting the leg of a jumper is punched out, wherein the jumper can be inserted into the clamp housing 2 through a plug opening 24. The plug opening 24 is located on the operator side of the series terminal 1 and is easily accessible to a user. A corresponding opening 25, for inserting the plug 10, is also provided on the operator side. Overall, the spring elements 20, 20' have an approximately S-shaped configuration, wherein the spring elements 20, 20' are preferably fastened in the clamp housing 2 via correspondingly designed projections.

Figure 1B:
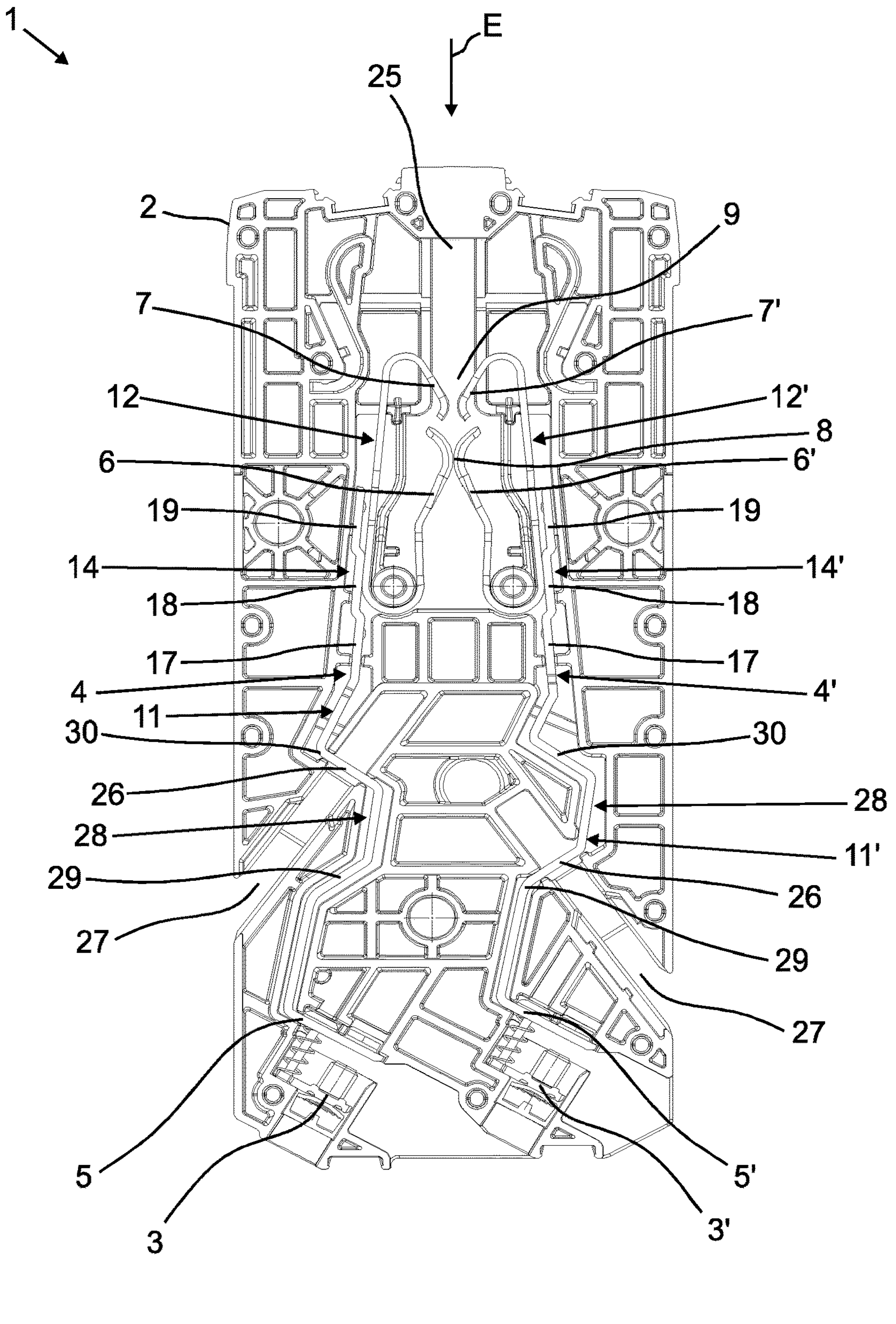
FIG. 1*b* is a diagrammatic longitudinal sectional view of the series terminal according to FIG. 1*a* with differently-positioned contact sections.
Figure 1C:
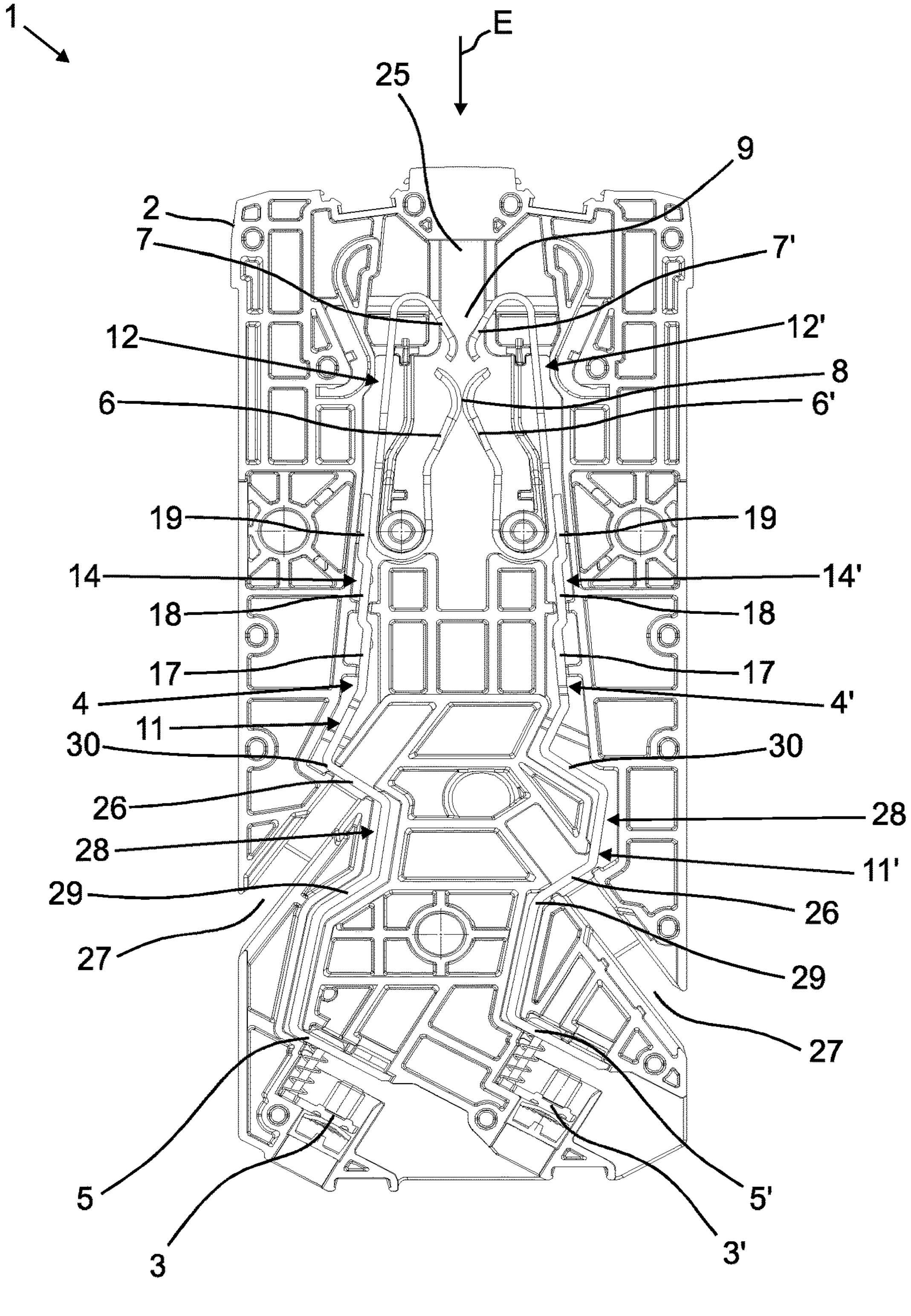
FIG. 1*c* is a diagrammatic longitudinal sectional view of the series terminal according to FIG. 1*b* with differently-positioned contact sections, in a longitudinal section.

In addition, bridge recesses 26 are provided in the first metal strips 11, 11', which recesses are used to accommodate a jumper in order to be able to connect two series terminals 1 directly to one another. The bridge recesses 26 are accessible in the clamp housing 2 by a bridge shaft 27. FIGS. 1*a*, 1*b*, and 1*c* show that the bridge recesses 26 are offset in the first metal strips 11, 11'. The first metal strips 11, 11' are congruent and have an approximately trapezoidal bend 28 in the area of the bridge recesses 26. In the case of the first metal strip 4, the bridge recess 26 is made on a first trapezoidal leg 29, whereas in the case of the other first metal strip 11', the bridge recess is made on the second trapezoidal leg 30. The trapezoidal legs 29, 30 have the geometry of a trapezoid corresponding to slopes with various signs, so that the legs of an inserted jumper can be inserted obliquely into the clamp housing 2.

Figure 2A:
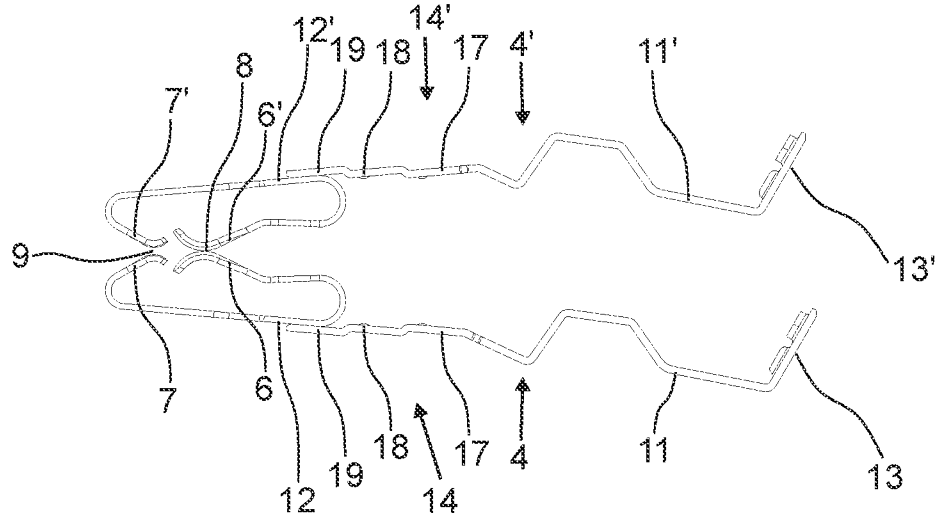
FIG. 2*a* is a depiction of two current bars with a stepped area.
Figure 2B:
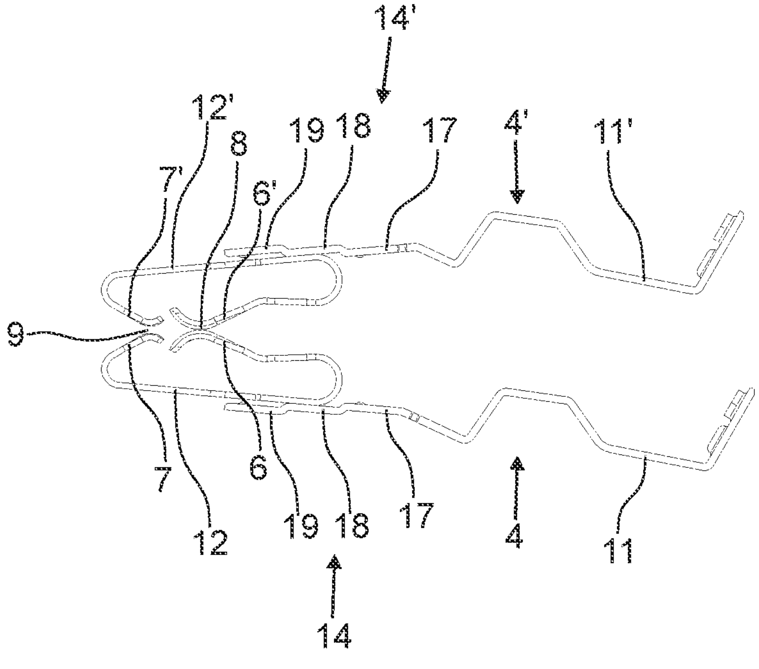
FIG. 2*b* is a depiction of two current bars with a stepped area according to FIG. 2*a* with differently-positioned contact sections.
Figure 2C:
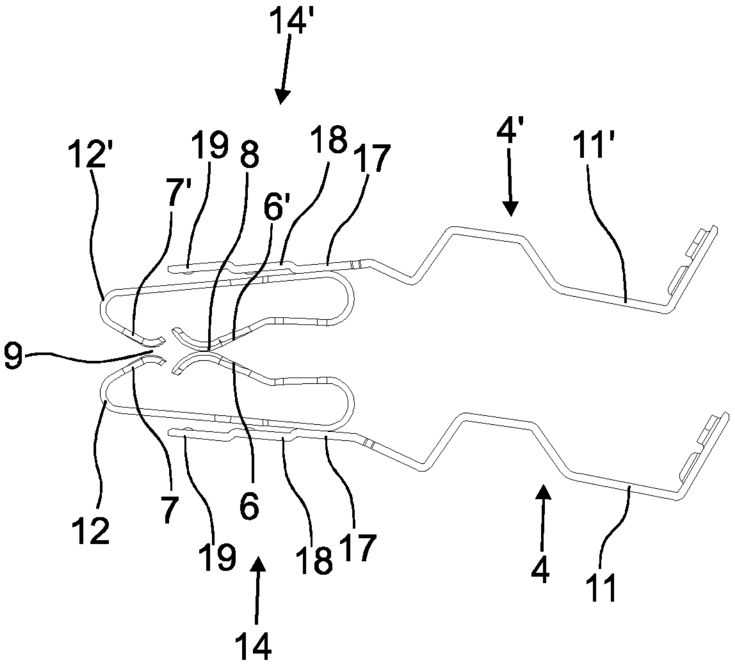
FIG. 2*c* is a depiction of two current bars with a stepped area according to FIG. 2*b* with differently-positioned contact sections.

FIGS. 2*a*, 2*b*, and 2*c* show the current bars 4, 4' of the series terminal 1. It is evident that the relative length of the current bars 4, 4' changes depending on which step 17, 18 or 19 the second metal strips 12, 12' are arranged. The first metal strips 11, 11' are configured to be as congruent as possible. Only the stepped areas 14, 14' are arranged to be mirror images of one another, so that, in the case of the two current bars, based on the step form, a support or site option for the second metal strips 12, 12' is provided. Overall, for various configurations of the series terminal 1, consequently only two different current bars 4, 4' are necessary. The second metal strips 12, 12' can be arranged at various steps 17, 18 and 19 of the stepped area 14, 14'. In FIG. 2*a*, the second metal strips 12, 12' are arranged, for example, at the third step 19, whereas in FIG. 2*b*, they are positioned at the second step 18, and in FIG. 2*c*, they are positioned at the first step 17.

Figure 3:
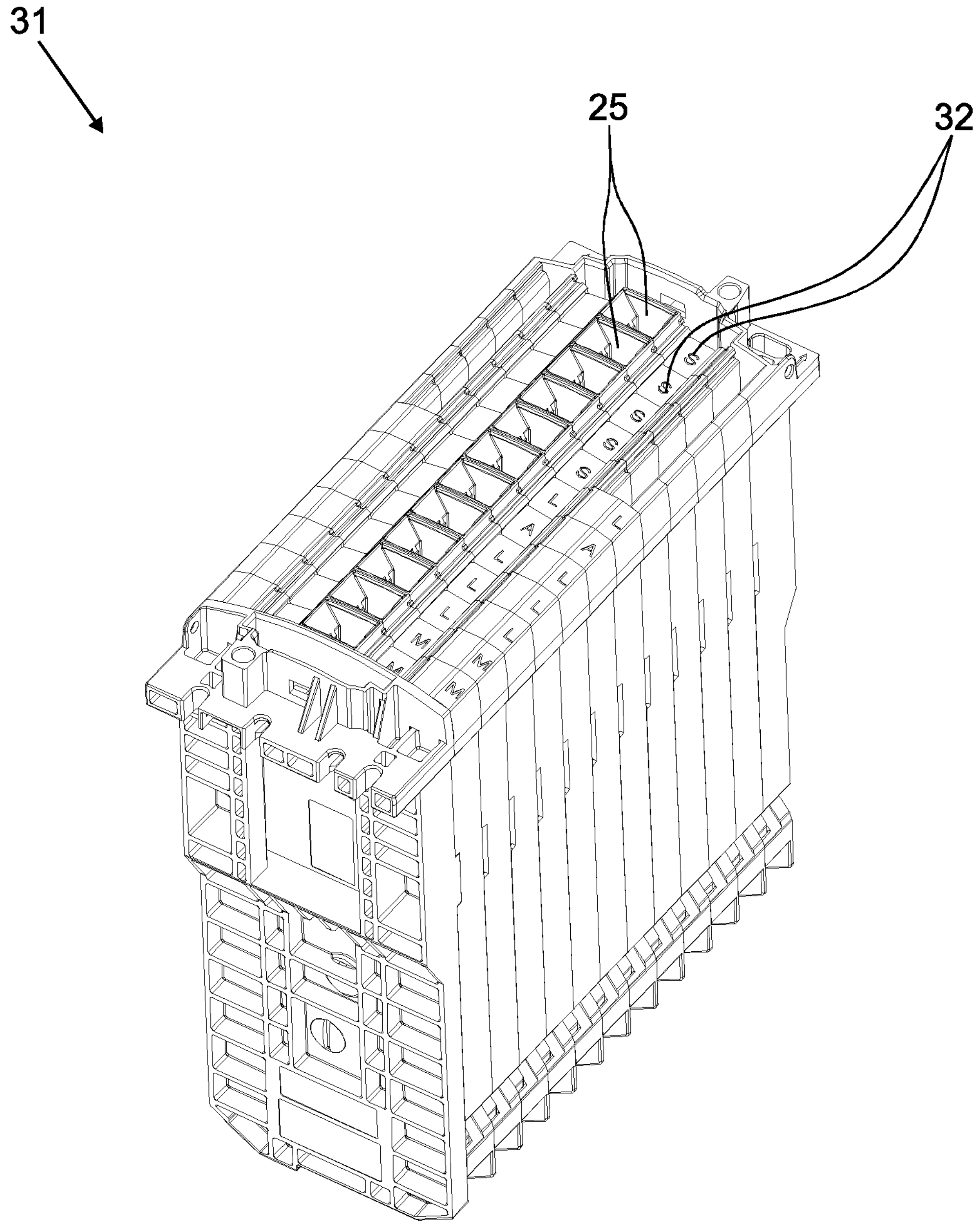
FIG. 3 shows a perspective view of a series terminal block.

FIG. 3 shows a series terminal block 31 with multiple series terminals 1 according to the invention, which terminals are arranged one next to the other. The clamp housing 2 is configured as a disk, so that multiple series terminals 1 can be arranged with their base on one another, without making it unnecessarily bulky. In the perspective depiction, the opening 25 for inserting a test plug can be seen. Beside the opening 25, fields 32 are arranged, which fields are marked S, M, and L. The fields 32 are used to identify the series terminal 1, so that from the outside, it is possible to see on which of the three steps 17, 18, 19 of the contact sections 6, 6', 9, 9' the second metal strips 12, 12' are arranged. Accordingly, the user can see which of the series terminals 1 is first contacted when a test plug is inserted, or at which series terminal 1 the electrically-conductive connection is first separated when a test plug block with identical test plugs is inserted into the series terminal block 31.

Figure 4:
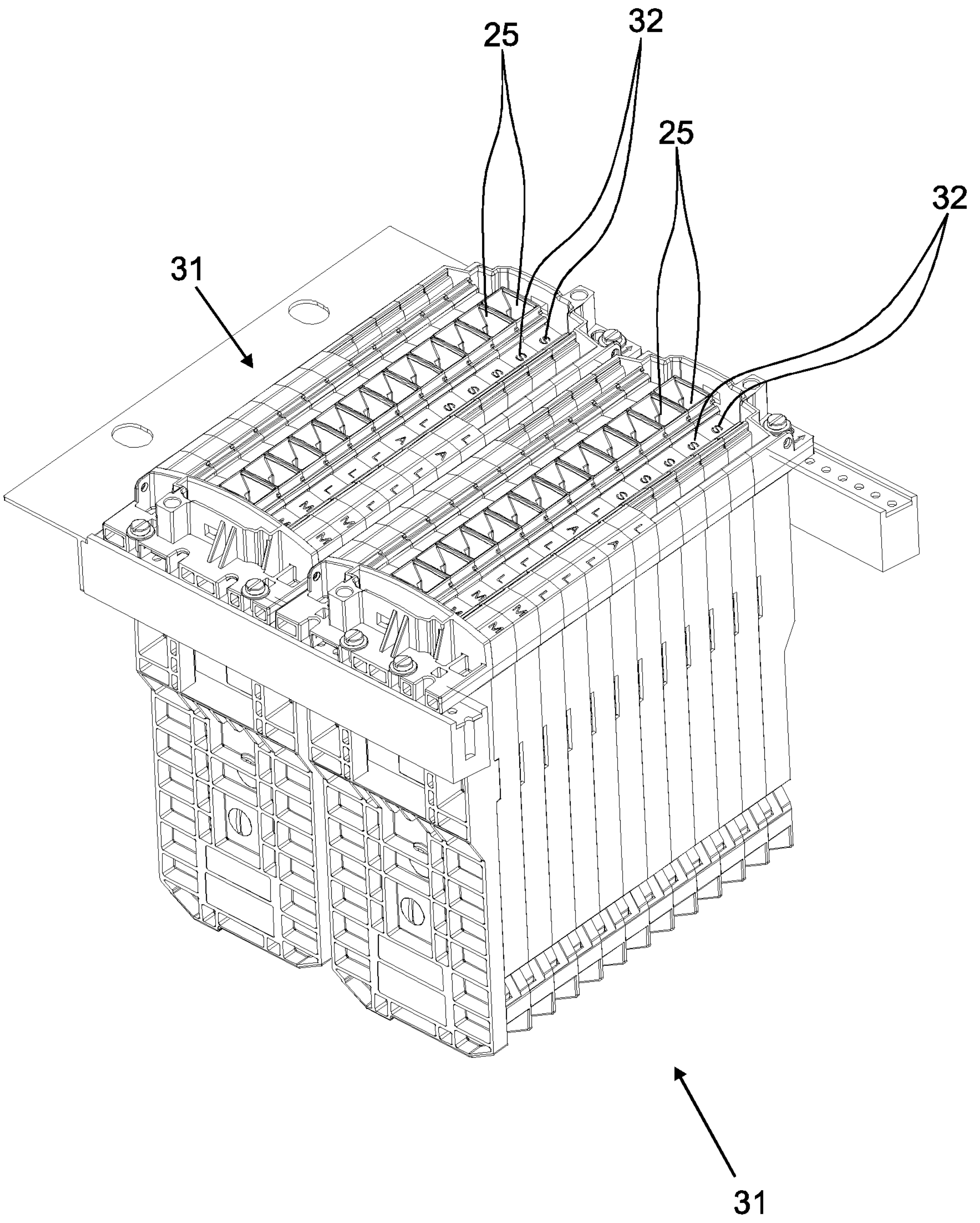
FIG. 4 is a perspective view of two series terminal blocks that are mounted one next to the other.

FIG. 4 shows two series terminal blocks 31 that are arranged one next to the other as they can be arranged, for example, in a switch cabinet. The configuration of the series terminals 1 inside the series terminal block 31 is freely selectable. The clamp housings 2 are indistinguishable from one another in the fields 32, so that the series terminal blocks can be assembled in an easily modular manner and for the desired purpose.

Figure 5:
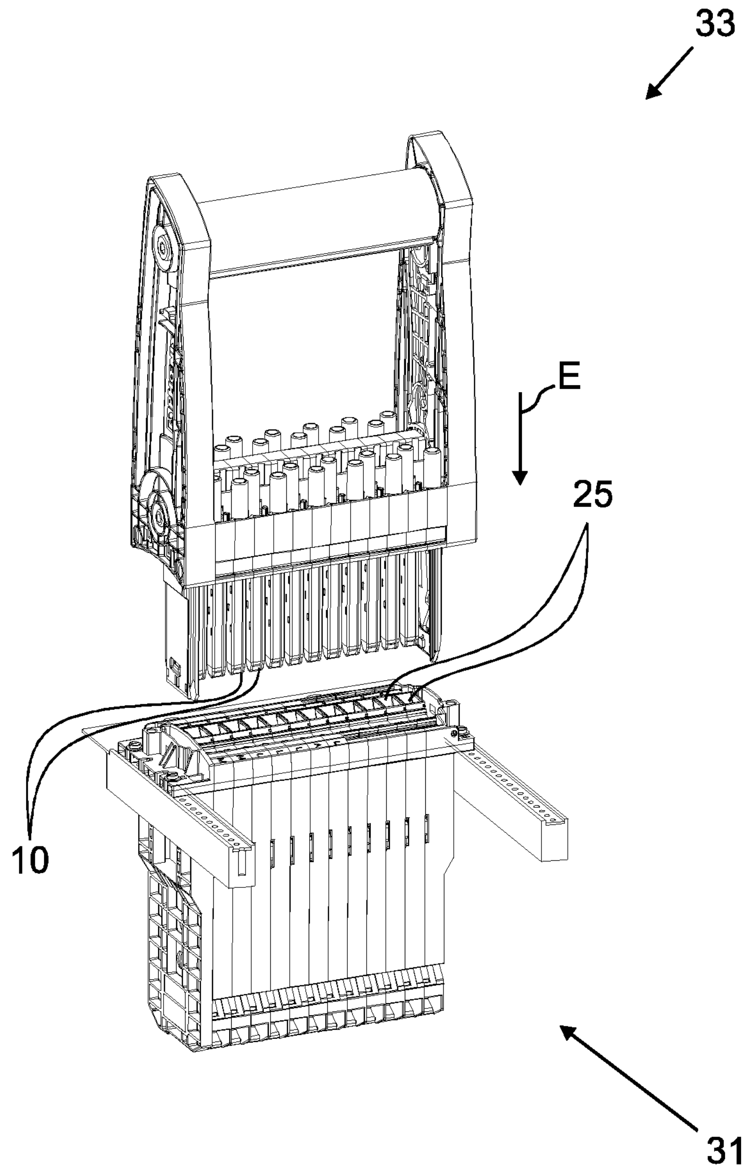
FIG. 5 is a perspective view of a series terminal block with a test plug block that corresponds thereto.

FIG. 5 shows a series terminal block 31 with a test plug block 33. The plugs 10 of the test plugs all have the same length, since the switching operations, based on the various configurations of the series terminals 1, are performed inside the series terminals 1. In this embodiment, the risk of using a wrong test plug block 33, i.e., a mis-contacting of the series terminals 1, is minimized, since the test plugs can all be configured identically.

What is claimed is:

1. An electrical series terminal, comprising:

a clamp housing, with at least two, line terminal elements that are arranged therein and two current bars, wherein each of the current bars has a connecting section, a first sprung contact section, and a second sprung contact section, wherein each connecting section is assigned to a respective one of the two line terminal elements, wherein the first sprung contact sections together form a first contact area and the second sprung contact sections together form a second contact area for accommodating and contacting a plug of a test plug or an isolating plug, wherein the first contact sections make contact when no plug is inserted, so that the at least two, line terminal elements are connected to one another electrically via the two current bars, and wherein the second contact sections are separated from one another when no plug is inserted, wherein the second contact area of the current bars is arranged in the insertion direction of the plug before the first contact area of the current bars, and wherein each of the current bars is formed of two individual metal strips which are connected to one another in an electrically conductive manner, wherein each of the two connecting sections is made on a first of the two individual metal strips, and each of the contact sections are formed together by a second of the two individual metal strips, wherein the first of the two individual metal strips has a stepped area with at least two steps on an end thereof that faces away from the connecting section, wherein at least one first step and one second step are provided on the stepped area, wherein the first step is arranged behind the second step in an insertion direction of the plug, and wherein the second of the two individual metal strips are fastened to two opposite steps of the stepped area of the first metal strips.

2. The series terminal according to claim 1, wherein each of the second metal strips is a C-shaped contact spring that has a C-crest which is fastened to a step of the stepped area of the first metal strips.

3. The series terminal according to claim 1, wherein the stepped areas of the first two metal strips are configured to be mirror images of one another and wherein another part of the first two metal strips are congruent to one another.

4. The series terminal according to claim 1, wherein two spring elements are arranged in the clamp housing, each of which has a sprung contact section, wherein the contact sections of the two spring elements together form another contact area for the plug, which is arranged in the insertion direction of the plug before the second contact area of the current bars, and wherein at least one of the spring elements has a receptacle for a leg of a jumper, wherein each spring element is connected in an electrically conductive manner to a current bar via the plug, when the plug of a test plug or an isolating plug is inserted into the series terminal.

5. The series terminal according to claim 4, wherein at least one of the spring elements is provided with a recess formed as a receptacle for inserting of a leg of a jumper.

6. The series terminal according to claim 5, wherein at least one plug opening is provided in the clamp housing for inserting the leg of a jumper into the receptacle of a spring element, and wherein the plug opening is accessible from a first, operator accessible side of the clamp housing.

7. The series terminal according to claim 1, wherein an opening is provided in the clamp housing for inserting the plug of a test plug or an isolating plug into the contact areas, and wherein the opening is accessible from a first, operator accessible side of the clamp housing.

8. The series terminal according to claim 1, wherein, for accommodating a leg of a jumper, a bridge recess is provided in at least one of the first metal strips and at least one corresponding bridge shaft is provided in the clamp housing.

9. A series terminal block, comprising:

at least two series terminals that are arranged one next to the other, wherein the series terminals comprise:

a clamp housing, with at least two, line terminal elements that are arranged therein and two current bars, wherein each of the current bars has a connecting section, a first sprung contact section, and a second sprung contact section, wherein each connecting section is assigned to a respective one of the at least two, line terminal elements, wherein the first sprung contact sections together form a first contact area and the second sprung contact sections together form a second contact area for accommodating and contacting a plug of a test plug or an isolating plug, wherein the first sprung contact sections make contact when no plug is inserted, so that the at least two, line terminal elements are connected to one another electrically via the two current bars, and wherein the second sprung contact sections are separated from one another when no plug is inserted, wherein the second contact area of the current bars is arranged in the insertion direction of the plug before the first contact area of the current bars, and wherein each of the current bars is formed of two individual metal strips which are connected to one another in an electrically conductive manner, wherein each of the two connecting sections is made on a first of the metal strips, and each of the sprung contact sections are formed together by a second of the metal strips, and wherein the first of the metal strips has a stepped area with at least two steps on an end thereof that faces away from the connecting section and wherein the second of the metal strips are fastened to two opposite steps of the stepped area of the first metal strips.

10. The series terminal block according to claim 9, wherein the second of the metal strips of at least one series terminal are fastened to another step of the stepped area of the first metal strips as the second metal strips of the other series terminal.

11. A series terminal block according to claim 9, wherein the second metal strips of the series terminals are fastened in each case to the same step of the stepped area of the first metal strips.

* * * * *